(12) United States Patent
Min et al.

(10) Patent No.: US 7,806,067 B2
(45) Date of Patent: Oct. 5, 2010

(54) THRUST FIN FOR SHIPS

(75) Inventors: Keh-Sik Min, Seoul (KR); Bong-jun Chang, Ulsan (KR); Hong-gi Lee, Seoul (KR)

(73) Assignee: Hyundai Heavy Industries Co., Ltd. (KR)

( * ) Notice: Subject to any disclaimer, the term of this patent is extended or adjusted under 35 U.S.C. 154(b) by 0 days.

(21) Appl. No.: 11/629,475

(22) PCT Filed: Dec. 8, 2005

(86) PCT No.: PCT/KR2005/004193

§ 371 (c)(1),
(2), (4) Date: Dec. 14, 2006

(87) PCT Pub. No.: WO2006/115317

PCT Pub. Date: Nov. 2, 2006

(65) Prior Publication Data

US 2008/0066669 A1    Mar. 20, 2008

(30) Foreign Application Priority Data

Apr. 26, 2005    (KR)    ............ 10-2005-0034286

(51) Int. Cl.
*B63B 1/24* (2006.01)
(52) U.S. Cl. ............................................. 114/162
(58) Field of Classification Search .............. 114/162, 114/274–282
See application file for complete search history.

(56) References Cited

U.S. PATENT DOCUMENTS 4,653,418 A * 3/1987 Mori et al. ............... 114/162
5,231,947 A * 8/1993 Kasahara et al. ......... 114/162

FOREIGN PATENT DOCUMENTS

| DE | 4304158 A1 * | 8/1994 |
| JP | 02293296 A * | 12/1990 |
| JP | 04-201693 A | 7/1992 |
| JP | 05-026798 U | 4/1993 |
| JP | 07-237594 A | 9/1995 |
| JP | 11-139395 A | 5/1999 |

* cited by examiner

*Primary Examiner*—Edwin Swinehart
(74) *Attorney, Agent, or Firm*—Cantor Colburn LLP

(57) ABSTRACT

Disclosed herein is a thrust fin for ships which recovers lost energy caused by rotational flow generated behind a propeller, and converts it into thrust. The thrust fin of the present invention has a simple shape, enhances propulsive efficiency of the ship, and can be applied to a real ship thanks to the simple installation thereof, to maximize thrust of the ship. The thrust fin is mounted to a front portion of the rudder of the ship such that left and right sides of the thrust fin, which are integrated with each other into a single body, are asymmetrical. A vertical position, at which the thrust fin is mounted to the rudder, is at an optimum position as determined in consideration of the shape of the rudder and hydrodynamic characteristics.

5 Claims, 5 Drawing Sheets

__US 7,806,067 B2__

THRUST FIN FOR SHIPS

CROSS-REFERENCE TO RELATED APPLICATION

This application is a National Stage entry of International Application No. PCT/KR2005/004193, filed Dec. 8, 2005, the entire specification, claims and drawings of which are incorporated herewith by reference.

BACKGROUND OF THE INVENTION

1. Field of the Invention

The present invention relates to a thrust fin for ships that recovers lost energy caused by rotational flow, which is generated behind a propeller, and converts it into thrust.

2. Description of Related Art

As well known to those in the art, a propeller of a ship generates thrust using its rotation, but rotational flow is generated behind the propeller while the propeller rotates, as shown in FIG. 1. The rotational flow is irrelevant to the generation of the thrust, but merely causes energy loss. Thrust fins are one type of device that enhances propulsive efficiency of the ship through the recovery of a large amount of energy loss caused due to the rotational flow that is generated behind the propeller.

Such a thrust fin for a ship generates lift in the direction of the movement of the ship to enhance propulsive efficiency of the ship, in the same manner as that of the wings of an airplane. The thrust fin serves to generate strong lift, that is, strong thrust in the slipstream of a propeller, in which rotational flow is generated, while the speed of an axial current is increased by the propeller. Therefore, the thrust fin is preferably mounted to a rudder placed behind the propeller.

However, because this region has complex flow characteristics compared to other regions, it is very difficult to optimize an angle between the fin and a stream of fluid, that is, an angle of attack.

Meanwhile, the propeller, which rotates to move the ship, accelerates the surrounding fluid. An axial acceleration factor of the fluid generates thrust, but an acceleration factor, related to a direction of rotation of the propeller, merely causes energy loss, without helping the thrust to increase.

To recover lost energy caused by the acceleration factor related to the direction of rotation of the propeller, additional devices of various shapes have been developed and used in a rear portion of the body of the ship. However, most conventional additional devices are problematic in that they can improve propulsive efficiency only in a specific ship and under voyage conditions. Furthermore, due to the complex structure, installation costs are high, so that the possibility of application to a real ship is reduced.

However, the above-mentioned thrust fin, which is mounted to the rudder of the ship, can markedly enhance propulsive efficiency of the ship despite having a simple structure. Furthermore, because installation of the thrust fin is simple, it is easily applied to a real ship. Hence, a method for optimizing an angle of attack to increase thrust using a thrust fin was proposed by the inventor of the present invention (in Korean Patent Application No. 1988-0018041).

Because the thrust fin can generate strong thrust in the slipstream of the propeller, in which fluid is accelerated by the propeller, the thrust fin is typically mounted to the rudder of the ship in a shape where two fins are provided on respective left and right sidewalls of the rudder, as shown in FIGS. 2A and 2B. Furthermore, the slipstream of the propeller has an asymmetric flow characteristic due to an influence of the body of the ship. Therefore, the left and right sides of the thrust fin must be designed in an asymmetric shape corresponding to the asymmetric flow characteristics, thus markedly enhancing thrust.

SUMMARY OF THE INVENTION

Accordingly, the present invention has been made keeping in mind the above problems occurring in the prior art, and the object of the present invention is to provide a thrust fin for a ship which has a simple shape, enhances propulsive efficiency of the ship, and can be applied to a real ship thanks to the simple installation thereof, to maximize thrust of the ship.

DETAILED DESCRIPTION OF THE INVENTION

Figure 3A:
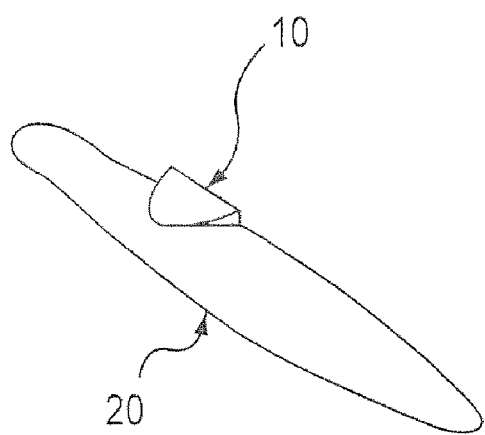
FIGS. 3A and 3B are views showing a thrust fin according to the present invention.
Figure 3B:
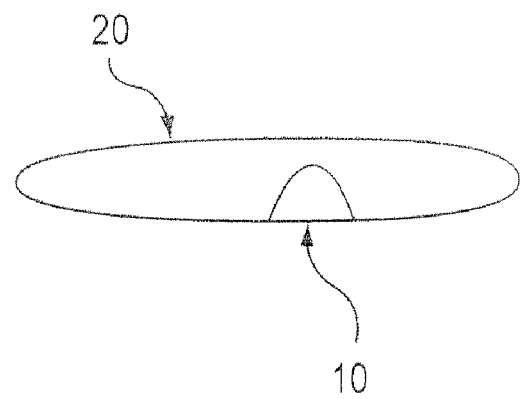
Figure 4:
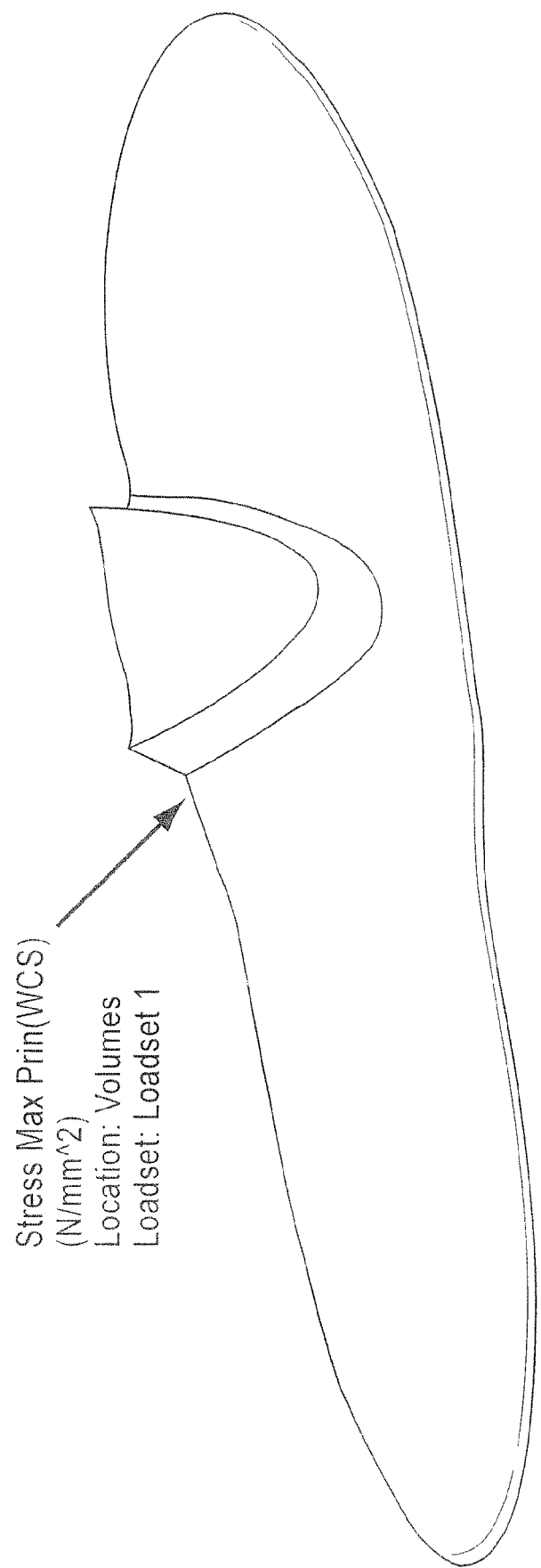
FIG. 4 is an analysis view showing structural strength of the thrust fin according to the present invention.
Figure 5A:
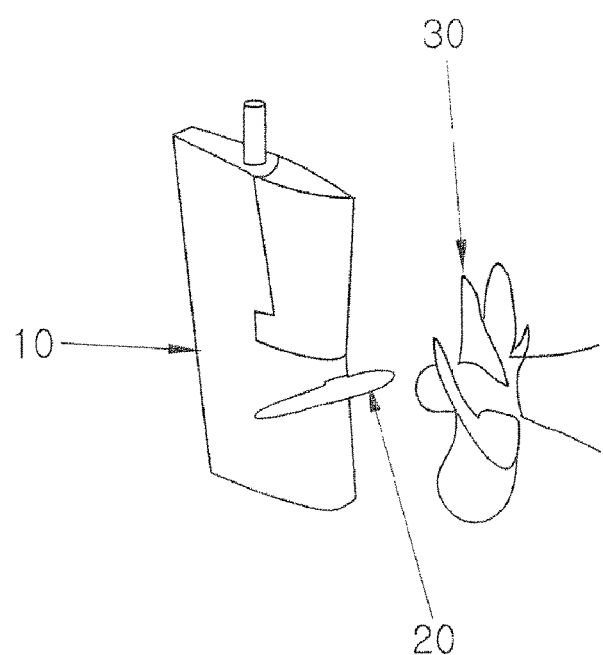
FIGS. 5A and 5B are views showing the shape and numerical analysis modeling of the thrust fin according to the present invention.
Figure 5B:
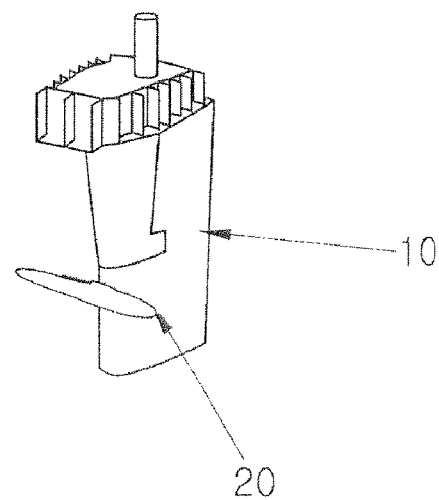
Figure 6:
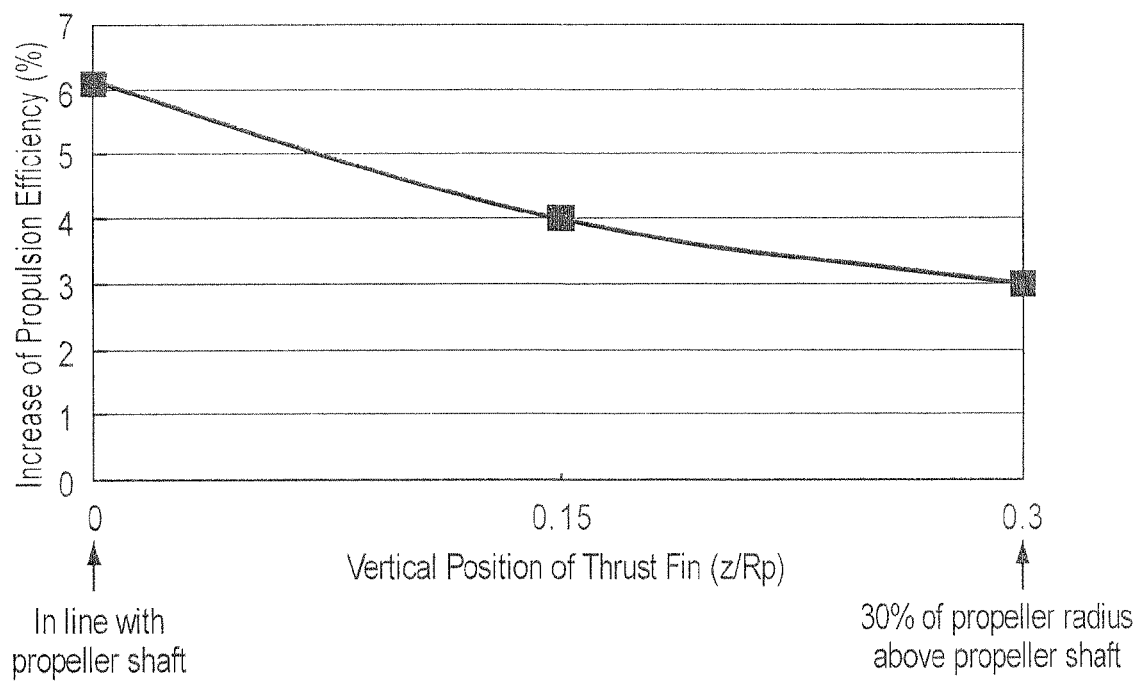
FIG. 6 is a graph showing a change in propulsive efficiency of the thrust fin according to the present invention.

FIGS. 3A and 3B are views showing a thrust fin 20 according to the present invention. FIG. 4 is a perspective view of the thrust fin 20 according to the present invention. FIGS. 5A and 5B are views showing the shape and numerical analysis modeling of the thrust fin according to the present invention. FIG. 6 is a graph showing a change in propulsive efficiency of the thrust fin according to the present invention. The present invention provides a thrust fin mounted to a rudder of a ship to increase propulsive efficiency of the ship. The thrust fin is mounted to a front portion of the rudder 10 of the ship such that left and right sides of the thrust fin 20, which are integrated with each other into a single body, are asymmetrical. A vertical position, at which the thrust fin 20 is mounted to the rudder 10, is at an optimum position as determined in consideration of the shape of the rudder and hydrodynamic characteristics.

The present invention is a result obtained through many tests and studies for application to real ships. The present invention relates to the shape and installation position of a thrust fin for a ship which markedly enhances propulsive efficiency of the ship, has a structure such that a manufacturing process and installation thereof are simplified, and ensures structural strength and stability.

Figure 1:
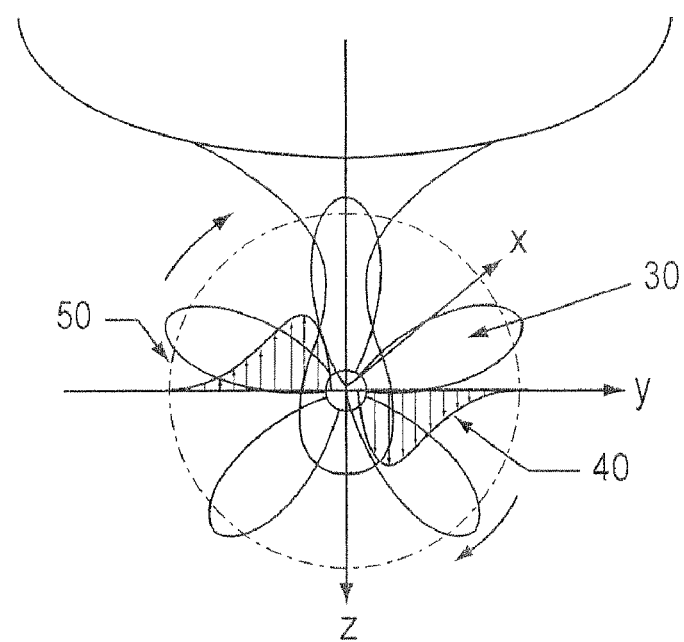
FIG. 1 is a distribution graph of rotational-flow defined in a counterflow region of a propeller, which rotates in a clockwise direction.
Figure 2A:
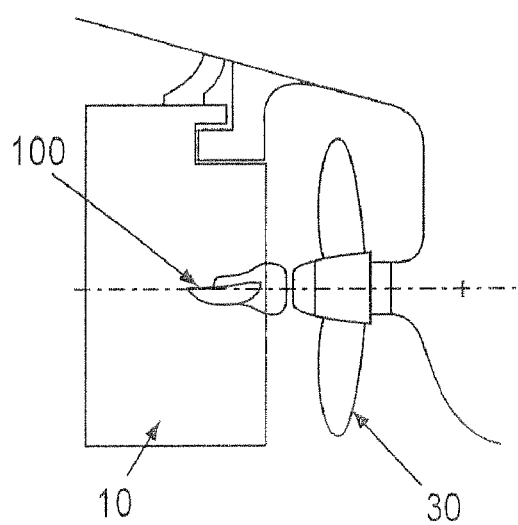
FIGS. 2A and 2B are views showing a conventional thrust fin.
Figure 2B:
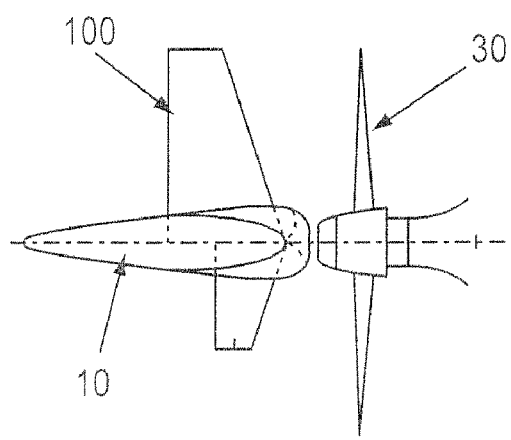

Typically, as shown in FIG. 1, rotational flow 40, which occurs behind a propeller 30 due to rotation of the propeller 30, flows in an opposite direction, based on a horizontal plane passing through the center of the propeller, and is asymmetrical in flow characteristic based on a rudder under the influence of flow characteristics, due to the body of a ship. Therefore, a thrust fin has an asymmetric shape to increase the thrust. FIGS. 3A and 3B illustrate the shape of a thrust fin 20 of the present invention, which has an asymmetric shape and is attached to a rudder 10 to increase thrust of a ship.

Here, if two fins, which are separated from each other, are attached to the rudder, high stresses are applied to junctions between the rudder 10 and the fins, as appreciated in the cantilever theory. As a result, separate reinforcements are required around the junctions at which the fins are attached to the rudder. To solve the above-mentioned problems in the present invention, the thrust fin is manufactured as an integrated structure, thus simplifying the manufacturing process thereof, and increasing strength. Furthermore, it has been confirmed that the stability of the thrust fin is ensured from a numerical analysis of structural strength of the fin shown in FIG. 4.

The thrust fin is disposed ahead of the rudder to increase the thrust in slipstream of the propeller. Furthermore, the thrust fin has a structure in which it is inserted into a groove, which is formed at a predetermined position in the rudder. Therefore, initial installation of the thrust fin is simple, and even if the thrust fin is damaged due to an accident, the thrust fin can be easily replaced with a new one.

Hereinafter, the present invention will be described with reference to a preferred embodiment.

FIGS. 5A and 5B show a thrust fin designed according to the following embodiment and attached to a rudder. A self-propulsion test of a model ship was conducted to confirm an increase in propulsive efficiency using the thrust fin.

Example

A thrust fin, which has a left length (compared to a propeller) of approximately 0.5 Rp and a right length of approximately 0.4 Rp (Rp: the radius of the propeller) and a maximum width (compared to the propeller) of 0.15 Rp, was attached to a rudder of a ship (see, FIGS. 5A and 5B), and a change in propulsive efficiency, according to the vertical position at which the fin is attached to the rudder, was tested.

As shown in FIG. 6, in the thrust fin developed through the study, it was confirmed that, when the thrust fin is attached to a position aligned with the central shaft, the propulsive efficiency is increased by approximately 6%, when it is attached to a position spaced apart from the central shaft in an upward direction by 0.15 Rp, the propulsive efficiency is increased by approximately 4%, and when it is attached to a position spaced apart from the central shaft in an upward direction by 0.3 Rp, the propulsive efficiency is increased by approximately 3%.

As described above, a thrust fin for a ship according to the present invention has a structure such that the manufacturing process and the installation thereof are simple. Furthermore, the thrust fin can increase propulsive efficiency of the ship, thus markedly enhancing economic efficiency in operation of the ship.

Although the preferred embodiment of the present invention has been disclosed for illustrative purposes, the present invention is not limited to the preferred embodiment. Furthermore, those skilled in the art will appreciate that various modifications are possible, without departing from the scope and spirit of the invention as disclosed in the accompanying claims, and these modifications fall within the bounds of the present invention.

The invention claimed is:

1. A single thrust fin mounted to a rudder of a ship to increase propulsive efficiency of the ship,
   wherein the thrust fin is formed in the form of a single body and includes a left side and a right side thereof; and
   wherein the thrust fin is mounted into a groove formed in a front portion of the rudder of the ship in such a manner that a portion between the left side and the right side of the thrust fin is detachably inserted into the groove of the rudder, a front portion of the thrust fin protrudes ahead of the rudder, and the left and right sides of the thrust fin extend asymmetrically away from a vertical center plane of the rudder, the left side extending in a horizontal plane further from the vertical center plane than right side.

2. The thrust fin according to claim 1, wherein the ship further comprises a propeller mounted on a shaft, the propeller having a predetermined radius, and wherein the left side of the thrust fin has a horizontal length approximately equal to 0.5 of the propeller radius and the right side of the thrust fin has a horizontal length equal to approximately 0.4 of the propeller radius.

3. The thrust fin according to claim 2, wherein the thrust fin has a maximum width of 0.15 of the propeller radius.

4. The thrust fin according to claim 2, wherein the thrust fin is attached to the rudder at a position in alignment with the shaft of the propeller.

5. The thrust fin according to claim 2, wherein the thrust fin is attached to the rudder at a position of up to 0.3 of the propeller radius above the propeller shaft.

* * * * *